United States Patent
Balon et al.

(10) Patent No.: US 11,689,076 B2
(45) Date of Patent: Jun. 27, 2023

(54) MOTOR COOLING SYSTEM FOR E-BOOSTING DEVICE

(71) Applicant: Garrett Transportation I Inc, Torrance, CA (US)

(72) Inventors: Petr Balon, Pozorice (CZ); Philippe Renaud, Sanchey (FR); Baptiste Van Haesebroeck, Xonrupt-Longemer (FR)

(73) Assignee: GARRETT TRANSPORTATION I INC, Torrance, CA (US)

( * ) Notice: Subject to any disclaimer, the term of this patent is extended or adjusted under 35 U.S.C. 154(b) by 198 days.

(21) Appl. No.: 16/950,010

(22) Filed: Nov. 17, 2020

(65) Prior Publication Data

US 2022/0158520 A1 May 19, 2022

(51) Int. Cl.
| | |
|---|---|
| *H02K 5/20* | (2006.01) |
| *H02K 9/19* | (2006.01) |
| *H02K 15/14* | (2006.01) |
| *H02K 5/02* | (2006.01) |
| *H02K 5/04* | (2006.01) |
| *F02B 33/40* | (2006.01) |
| *F02B 39/10* | (2006.01) |
| *F02C 6/12* | (2006.01) |

(52) U.S. Cl.
CPC .............. *H02K 5/20* (2013.01); *H02K 5/02* (2013.01); *H02K 5/04* (2013.01); *H02K 9/19* (2013.01); *H02K 15/14* (2013.01); *F02B 33/40* (2013.01); *F02B 39/10* (2013.01); *F02C 6/12* (2013.01)

(58) Field of Classification Search
CPC ......... F02B 33/40; F02B 39/10; H02K 15/14; H02K 5/203; H02K 9/19; H02K 5/20; H02K 5/02; H02K 5/04; H02K 5/06; H02K 5/08; H02K 1/32; H02K 1/20; H02K 9/00; H02K 9/02; H02K 9/04; H02K 9/06; H02K 9/08; H02K 9/10; H02K 9/12; H02K 9/14; H02K 9/16; H02K 9/18; H02K 9/193; H02K 9/197; F02C 6/12
USPC ........ 310/89, 52, 53, 54, 55, 56, 57, 58, 59, 310/60 A, 64
See application file for complete search history.

(56) References Cited

U.S. PATENT DOCUMENTS

| | | | |
|---|---|---|---|
| 4,297,784 A | 11/1981 | Vagman | |
| 5,852,865 A * | 12/1998 | Kirtley, Jr. ............. | B60L 15/20 29/447 |
| 6,429,559 B1 | 8/2002 | Severien et al. | |

(Continued)

FOREIGN PATENT DOCUMENTS

| | | |
|---|---|---|
| CN | 202260662 U | 5/2012 |
| CN | 102857047 B | 5/2015 |

(Continued)

*Primary Examiner* — Alexander A Singh
(74) *Attorney, Agent, or Firm* — Lorenz & Kopf, LLP (57) ABSTRACT

A motor assembly for an e-boosting device is disclosed. The motor assembly includes a motor case and a motor cavity within the motor case. The motor case is configured to receive an electric motor that is configured to drivingly rotate a rotor about an axis of rotation. The motor assembly also includes a through-hole defined by the motor case. The motor case configured to be received in an outer housing to cooperatively define a coolant jacket with the outer housing. The coolant jacket includes a fluid flow path defined partly by the through-hole. Methods of manufacturing the motor assembly are also disclosed.

18 Claims, 5 Drawing Sheets

(56) References Cited

U.S. PATENT DOCUMENTS

| | | |
|---|---|---|
| 6,964,250 B2 | 11/2005 | Wierl et al. |
| 7,038,343 B2 | 5/2006 | Agnes et al. |
| 7,767,105 B2 | 8/2010 | Uetsuji et al. |
| 7,965,002 B2 | 6/2011 | Savant |
| 8,215,014 B2 | 7/2012 | Amburgey |
| 9,130,421 B2 | 9/2015 | Chamberlin et al. |
| 9,287,755 B2 | 3/2016 | Barker et al. |
| 9,416,780 B2 | 8/2016 | Steele |
| 9,450,468 B2 | 9/2016 | Chamberlin et al. |
| 10,069,388 B2 | 9/2018 | Court et al. |
| 2006/0045735 A1 | 3/2006 | Holdik et al. |
| 2014/0265661 A1 | 9/2014 | Chamberlin et al. |
| 2018/0358849 A1 | 12/2018 | Saint-Michel et al. |
| 2019/0149017 A1* | 5/2019 | Leroy .................. H02K 9/19 310/54 |
| 2019/0273420 A1* | 9/2019 | Yasuda ................ H02K 9/19 |
| 2020/0080470 A1* | 3/2020 | Hehn ................... F04D 25/06 |
| 2021/0273520 A1* | 9/2021 | Kim ..................... H02K 5/203 |

FOREIGN PATENT DOCUMENTS

| | | |
|---|---|---|
| CN | 204511977 U | 7/2015 |
| CN | 109365633 A | 2/2019 |
| DE | 10141890 A1 | 3/2003 |
| DE | 202005008264 U1 | 9/2005 |
| EP | 0655824 B1 | 5/1995 |
| EP | 3623597 A1 | 3/2020 |
| KR | 19980017579 U | 7/1998 |
| WO | 2004055956 A2 | 7/2004 |

\* cited by examiner

MOTOR COOLING SYSTEM FOR E-BOOSTING DEVICE

TECHNICAL FIELD

The present disclosure generally relates to an e-boosting device and, more particularly, relates to a motor cooling system for an e-boosting device.

BACKGROUND

Charging devices, such as turbochargers or superchargers, are provided that boost performance by compressing a fluid that is then fed to a fuel cell stack, an engine, etc. In some cases, an e-boosting device is provided that has an electric motor configured to drive and rotate a compressor wheel for compressing an airflow, which is then fed to the fuel cell stack, the engine, etc.

These charging devices may include a cooling system. In the case of an e-boosting device, for example, a cooling system may be provided that directs flow of a coolant through the device to maintain operating temperatures within a predetermined range. The electric motor may be cooled, for example, to improve operating efficiency of the motor.

However, conventional cooling systems for e-boosting devices suffer from various deficiencies, and operating efficiency may be negatively affected as a result. It may be difficult to provide an acceptable cooling effect for some charging devices and/or under certain operating conditions. There may be space constraints that limit the size and/or routing of the cooling circuit, which can negatively affect cooling performance.

Thus, it is desirable to provide a cooling system for an e-boosting device that improves the cooling effect and/or operating efficiency. It is also desirable to provide an e-charger cooling system that is compact, highly manufacturable, and that is cost effective. Other desirable features and characteristics of the present disclosure will become apparent from the subsequent detailed description and the appended claims, taken in conjunction with the accompanying drawings and this background discussion.

BRIEF SUMMARY

In one embodiment, a motor assembly for an e-boosting device is disclosed. The motor assembly includes a motor case and a motor cavity within the motor case. The motor case is configured to receive an electric motor that is configured to drivingly rotate a rotor about an axis of rotation. The motor assembly also includes a through-hole defined by the motor case. The motor case configured to be received in an outer housing to cooperatively define a coolant jacket with the outer housing. The coolant jacket includes a fluid flow path defined partly by the through-hole.

In another embodiment, an e-boosting device is disclosed that includes a method of manufacturing an e-boosting device. The method includes providing an electric motor that is configured to drivingly rotate a rotor. The method also includes encasing the electric motor within a motor cavity of a motor case. The motor case defines a through-hole. Furthermore, the method includes disposing the motor cavity within an outer housing to define a coolant jacket of a cooling system. The coolant jacket is cooperatively defined by the outer housing and the motor case. The coolant jacket includes a fluid passage defined by the through-hole.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Broadly, example embodiments disclosed herein include an improved e-boosting device. The disclosed e-boosting device may be a device with an electrically driven compressor wheel that provides a compressed airstream to a downstream component (e.g., an engine, a fuel cell stack, etc.). Also, the e-boosting device of the present disclosure may be configured as an electrically assisted turbocharger, an electric supercharger, as a hybrid turbocharger, as an e-charger assembly, e-turbo, e-assist charging device, or other related component. In particular, an e-boosting device and methods of manufacturing the same are disclosed, wherein the e-boosting device also includes a fluid cooling system through which a coolant (e.g., ethylene glycol) flows for removing heat from the e-boosting device.

The e-boosting device may include a motor case, which encases an electric motor and holds core windings together. At least part of the motor case may be heat conductive for transferring heat from the motor to the coolant. The motor case may have relatively thin wall thickness (especially compared with conventional motor cases) such that mass is reduced, material costs are reduced, and such that heat is transferred quickly and efficiently therethrough to the coolant. Materials for the motor case may be chosen to be chemically resistant to the coolant and non-magnetic to avoid interference with motor operations. The motor case may also define one or more fluid boundaries, barriers, partitions, dams, etc. for directing the coolant flow through the cooling system. The motor case may be compact, manufactured efficiently, and can provide additional advantages as discussed below.

There may be a plurality of casing members that cooperatively define the motor case and that cooperatively encapsulate the motor. In some embodiments, there may be a first casing member and a second casing member. At least one of the casing members may span over and cover over the stator of the motor, and at least part of the casing member may include a barrier, dam, partition, or other member that projects therefrom. This barrier member may partition the coolant system and may direct the coolant therethrough.

The motor case may encapsulate the motor with a rotor shaft extending outward therefrom. Also, the motor case may be positioned within an outer housing of the e-boosting device. A coolant jacket may be defined between and cooperatively defined by the inner surface of the outer housing and the outer surface of the motor case.

Furthermore, in some embodiments, the motor case may be formed to include or at least partly define a hole therethrough. The hole may be a gap, aperture, or other void that is independently defined through motor case. This hole, etc. may define a fluid passage for the coolant to flow from one area of the coolant jacket to another. In other words, the hole may fluidly connect these areas of the coolant jacket.

In some embodiments, the motor case may include a shell portion that covers over the stator and a projecting portion that projects outboard from the shell portion. The projecting portion may partition the coolant jacket (i.e., separate one area of the coolant jacket from another, dam the coolant, and/or direct the flow of coolant through the coolant jacket). The hole in the motor case may be defined at least partly by the projecting portion of the motor case such that coolant is able to flow through the projecting portion. In some embodiments, the hole may be defined between the projecting portion and the shell portion.

Accordingly, coolant may flow from an inlet, into and through the coolant jacket, and to an outlet to remove heat (e.g., from the stator of the motor, from the housing, from the casing, from one or more bearing components, or from other areas proximate the coolant jacket). The coolant may be directed through the hole in the motor case as it flows through the coolant jacket for effectively removing heat from the e-boosting device. A plurality of cooling passages may be defined with a predetermined shape, size, and flow profile in order to provide the desired flow of the coolant. Additionally, manufacturing methods of the present disclosure can be employed for forming the motor case efficiently, accurately, and repeatably in a high-volume manufacturing environment.

Figure 1:
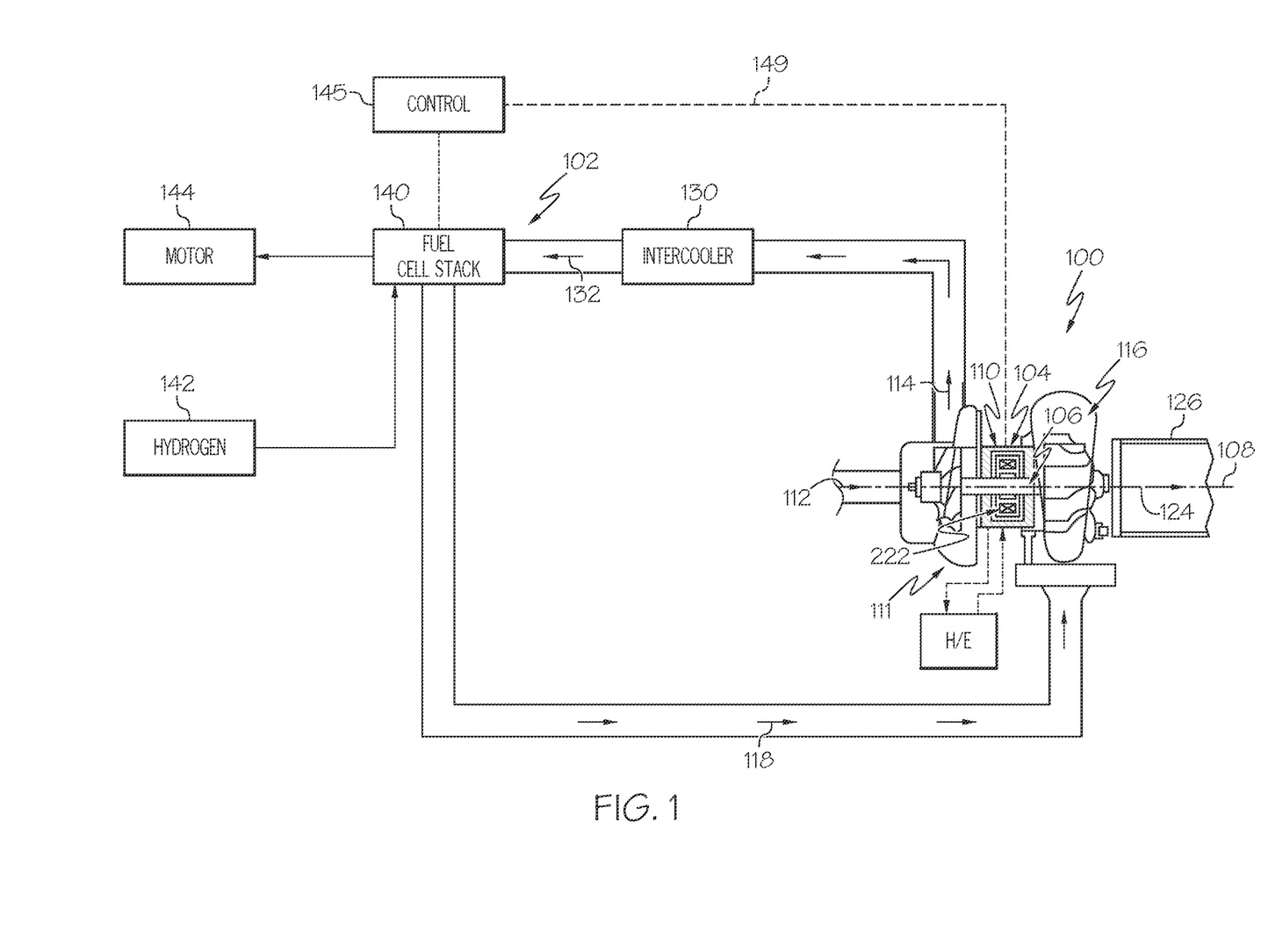
FIG. 1 is a schematic illustration of an e-boosting device incorporated, for example, in a fuel cell system.

FIG. 1 is a schematic view of an example e-boosting device 100 according to example embodiments of the present disclosure. In some embodiments, the e-boosting device 100 may be incorporated within a fuel cell system 102 of a vehicle.

Generally, the e-boosting device 100 may include an e-charger housing 104 and a rotor 106 (i.e., a rotating group). The rotor 106 may be supported for rotation by one or more bearings within the e-charger housing 104 about an axis of rotor rotation 108.

The e-boosting device 100 may include a motor section 110. The motor section 110 may include an electric motor 222 that selectively drives the rotor 106 in rotation about the axis 108.

The e-boosting device 100 may also include a compressor section 111 with a compressor wheel that is fixed to the rotor 106 and that rotates within the housing 104 (within a compressor housing member). As a result of rotation of the rotor 106, the compressor section 111 of the e-boosting device 100 may compress a received input air stream 112 into a pressurized air stream 114. This pressurized air stream 114 may be directed to the fuel cell system 102.

The e-boosting device 100 may also include a turbine section 116. The turbine section 116 may include a turbine wheel that is fixed an end of the rotor 106 that is opposite the compressor section 111, and this turbine wheel may rotate within the housing 104 (within a turbine housing member). The turbine section 116 may be configured to receive a high-pressure and high-temperature exhaust gas stream 118 from the fuel cell system 102.

The turbine section 116 may transfer and/or convert energy of the exhaust gas stream 118. For example, the turbine section 116 may drive the rotor 106 to drive rotation of the compressor section 111. In additional embodiments, the turbine section 116 may be operatively connected to an electric generator for generating electrical energy for the motor section 110. The high-pressure exhaust gas stream 118 may become a lower-pressure exhaust gas stream 124 that is released into a downstream exhaust pipe 126.

From the compressor section 111, the pressurized air stream 114 may be characterized by an increased temperature, over that of the input air stream 112. Accordingly, the air stream 114 may be channeled through an air cooler 130 (i.e., an intercooler), such as a convectively cooled charge air cooler. The air cooler 130 may be configured to dissipate heat from the air stream 114, increasing its density. The resulting cooled and pressurized air stream 132 may be channeled to a fuel cell stack 140, or alternatively, into a subsequent-stage, in-series compressor.

Hydrogen may be supplied to the fuel cell stack 140 from a tank 142, and oxygen may be supplied to the fuel cell stack 140 to generate electricity by a known chemical reaction. The fuel cell stack 140 may generate electricity for an electrical device, such as an electric motor 144.

A control system 145 may be included for controlling the various systems. The control system 145 may be connected to one or more components via communication connection(s) 149. The control system 145 may be a computerized system with a processor, various sensors, and other components for electrically controlling operation of the motor 144, the fuel cell stack 140, and/or the e-boosting device 100. Also, the fuel cell system 102 may be included in a vehicle, such as a car, truck, sport utility vehicle, van, motorcycle, etc. Therefore, in some embodiments, the electric motor 144 may convert the electrical power to mechanical power to drive and rotate an axle (and, thus, one or more wheels) of the vehicle. In these embodiments, the control system 145 may be incorporated within a vehicle control unit, which controls a number of additional vehicle systems (e.g., braking systems, air-conditioning systems, etc.).

Thus, during operations, oxygen may be provided to the fuel cell stack 140, at least in part, by the e-boosting device 100 as represented in FIG. 1. More specifically, the motor section 110 may drive rotation of the rotor 106, and the compressor section 111 may provide the pressurized air stream 114 to the air cooler 130 as it flows to the stack 140, and the exhaust gas stream 118 from the stack 140 may be fed back to the turbine section 116 for providing power assist to the motor section 110. It will be appreciated, however, that other embodiments of the e-boosting device 100 fall within the scope of the present disclosure. For example, in some embodiments, the turbine section 116 may be omitted such that the e-boosting device 100 includes the motor section 110 as well as the compressor section 111. Additionally, in some embodiments, the e-boosting device 100 may include a plurality of sections, such as a plurality of compressor sections that are fluidly connected in succession to include a first (low pressure) stage that feeds a second (high pressure) stage that ultimately feeds the fuel cell system 102. Moreover, the e-boosting device 100 may be provided in systems other than the fuel cell system 102 without departing from the scope of the present disclosure.

It will be appreciated that the term "e-boosting device" as used herein is to be interpreted broadly, for example, to include devices with an electrically driven compressor wheel regardless of where the e-boosting device is incorporated, the type of system in which the e-boosting device is incorporated, etc. It will also be appreciated that the e-boosting device of the present disclosure may also be referred to as an electrically driven compressor assembly. Also, the e-boosting device of the present disclosure may be configured as an electric supercharger, as a hybrid turbocharger, as an e-charger device, e-turbo, or other related component.

Figure 2:
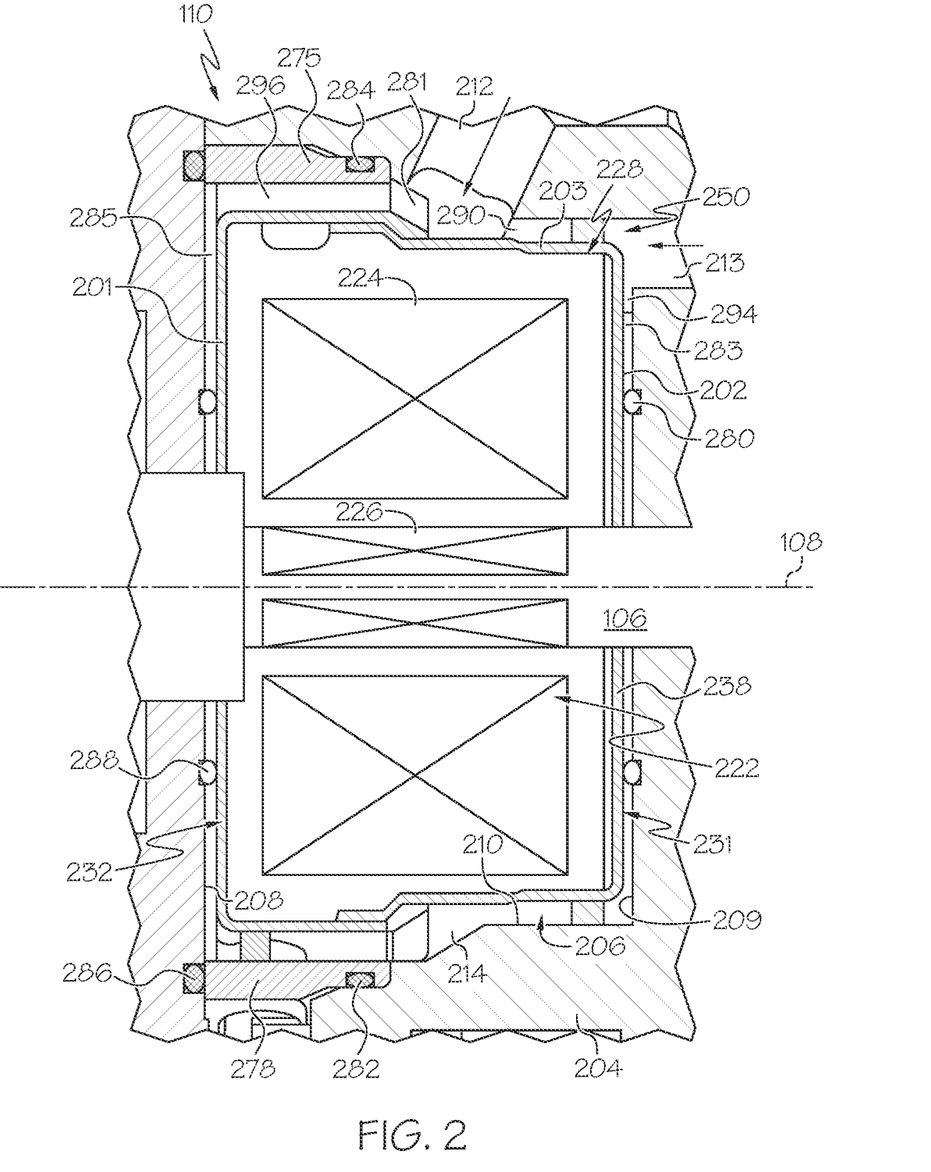
FIG. 2 is a cross-sectional view of a motor section of the e-boosting device according to example embodiments of the present disclosure.

Referring now to FIG. 2, the motor section 110 is shown in greater detail according to example embodiments. The motor section 110 may include the motor 222 as mentioned above. The motor 222 may include a stator 224 and a rotor member 226. The rotor member 226 may be fixed to the shaft of the rotor 106, and the rotor member 226 may be received within the stator 224 and may be operatively connected such that the rotor 106 is selectively driven in rotation by the motor 222.

Figure 3:
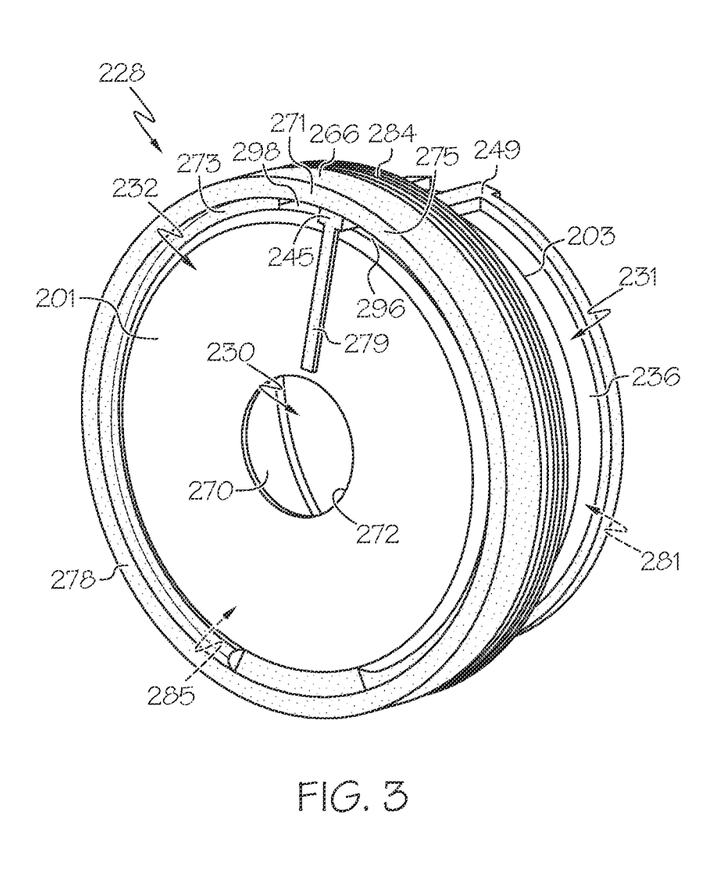
FIG. 3 is a first isometric view of a motor case of the motor section of FIG. 2 according to example embodiments of the present disclosure.
Figure 4:
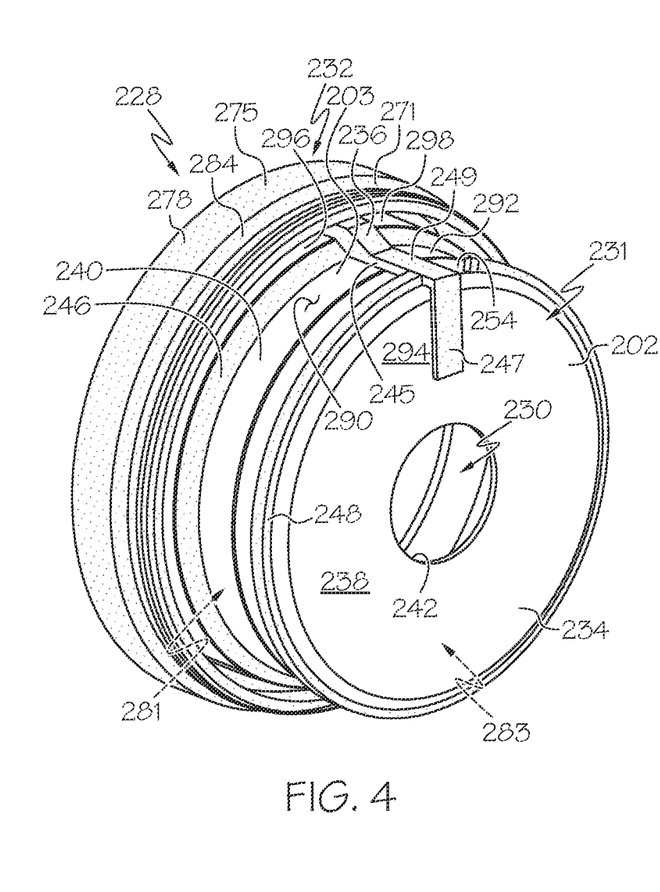
FIG. 4 is a second isometric view of the motor case of FIG. 2.

The motor 222 may be encased within a motor case 228 (FIGS. 2, 3, and 4). Generally, the motor case 228 may be a hollow, shell-like, thin-walled body. Thus, the motor case 228 may include an interior motor cavity 230 therein. The size and dimensions of the motor cavity 230 may correspond to that of the motor 222 to be nested and supported therein. The shaft of the rotor 106 may extend and project out from opposite sides of the motor case 228. Otherwise, the motor case 228 may substantially house, encapsulate, and support the motor 222.

Generally, the motor case 228 may be cylindrical and/or or barrel-shaped. The motor case 228 may include a first end 201 and a second end 202 that extend transverse to the axis 108 and that are spaced apart from each other along the axis 108. The motor case 228 may further include a side 203 that extends about the axis 108 in a circumferential direction. The side 203 may also extend longitudinally between the first end 201 and the second end 202.

For reference purposes, an "outboard direction" will be discussed relative to the motor case 228. For example, in the illustrated embodiments, the outboard direction can be directed longitudinally (i.e., substantially parallel to the axis) away from the first end 201 and away from the motor cavity 230. Furthermore, the outboard direction can be directed longitudinally (i.e., substantially parallel to the axis) away from the second end 202 and away from the motor cavity 230. Furthermore, the outboard direction can be directed radially away from the side 203 of the motor case 228.

Conversely, the motor case 228 may define an inboard direction that is directed toward the motor case 228 and the motor cavity 230 therein. The inboard direction is directed longitudinally into the motor cavity 230. Furthermore, the inboard direction is directed radially toward the side 203 of the motor case 228 and into the motor cavity 230.

As shown in FIG. 2, the motor case 228 may be received and fixedly supported within an outer housing 204. The outer housing 204 may define part of the housing 104 of the e-boosting device 100. The outer housing 204 may include one or more strong and robust (e.g., metallic) parts. The outer housing 204 may be block-like with an outer housing cavity 206 that is substantially cylindrical or barrel-shaped. As shown in FIG. 2, the outer housing cavity 206 may be defined by a first face 208, a second face 209, and a side face 210. The motor case 228 may be received within the outer housing cavity 206 such that the first end 201 opposes the first face 208, the second end 202 opposes the second face 209, and the side 203 opposes the side face 210.

Figure 7:
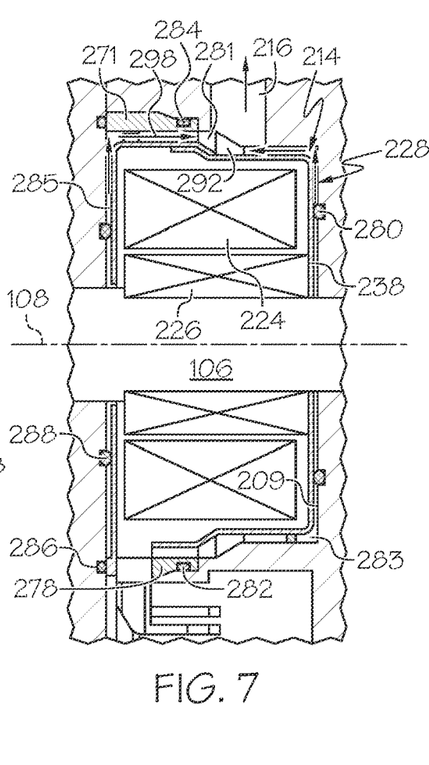
FIG. 7 is a cross-sectional view of the cooling system of FIG. 6.

Furthermore, the e-boosting device 100 may include a cooling system 250 (FIGS. 2 and 6-8). The cooling system 250 may include a plurality of fluid channels, reservoirs, passages, circuits, etc. that receive one or more flows of liquid coolant. The cooling system 250 may include at least one inlet, such as a first inlet 212 and a second inlet 213 (FIG. 2). The cooling system 250 may further include a coolant jacket 214. The coolant jacket 214 may be cooperatively defined by the motor case 228 and the outer housing 204 so as to surround the motor case 228. Stated differently, a majority of the exterior of the motor case 228 may be smaller than the interior surface of the outer housing cavity 206. As such, the exterior of the motor case 228 may be spaced away and separated at a distance from the interior surface of the outer housing cavity 206. The space between the exterior of the motor case 228 and the interior surface of the outer housing cavity 206 may define the coolant jacket 214. The cooling system 250 may additionally include at least one outlet 216 (FIG. 7). In some embodiments, liquid coolant may be provided via the inlets 212, 213 to the coolant jacket 214, and this coolant may be discharged via the outlet 216. As the coolant flows through the cooling system 250, the coolant may remove heat from the e-boosting device 100 to maintain high operating efficiency.

Figure 5:
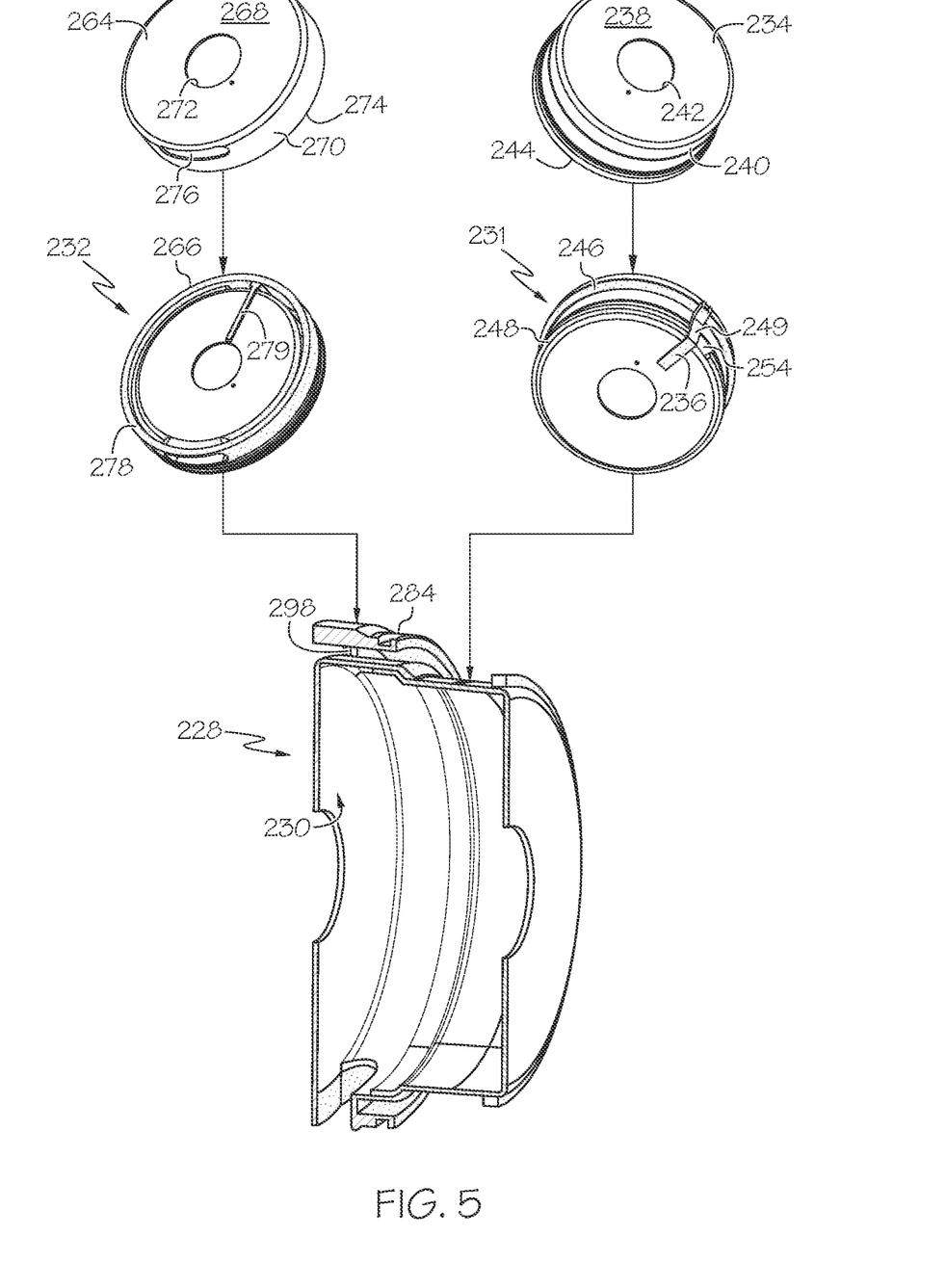
FIG. 5 is an exploded view of the motor case of FIGS. 3 and 4.
Figure 6:
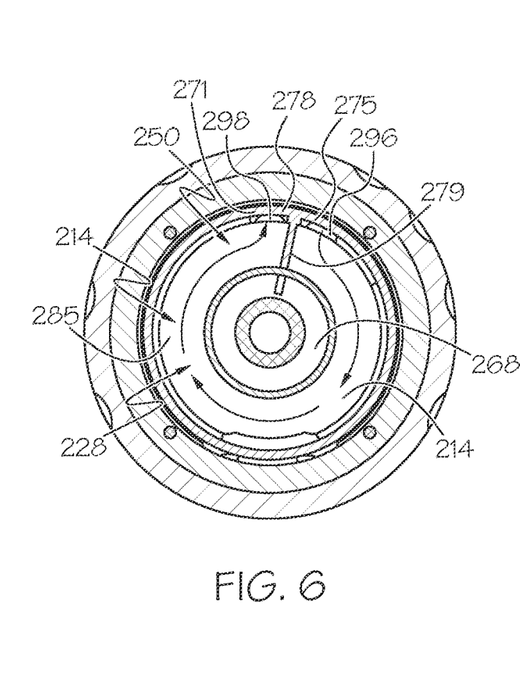
FIG. 6 is a first end view of a cooling system, which is partly defined by the motor case of FIG. 3.

Referring now to FIGS. 3-5, the motor case 228 will be discussed in detail according to example embodiments. In some embodiments, the motor case 228 may include a plurality of pieces, parts, members, etc. that cooperatively define the motor case 228 and the motor cavity 230 therein. For example, the motor case 228 may generally include a first casing member 231 and a second casing member 232, which are fixed together (e.g., removably attached) end-to-end so as to cooperatively define the motor case 228 and the motor cavity 230 therein. The first casing member 231 may be referred to as a "sleeve" and the second casing member 232 may be referred to as a "cap" for the motor 222 in some embodiments.

The first casing member 231 may include a first shell member 234. As shown in FIG. 5, the first shell member 234 may be unitary, cup-shaped, and thin-walled (e.g., as low as one millimeter wall thickness). The first shell member 234 may include a circular and plate-like end disc 238 (FIG. 5) and an annular ring 240 fixed thereto. The annular ring 240 may include one or more features (e.g., tapered sections, shoulders, edges, or other surface features) that vary the diameter of the annular ring 240 as it projects from the disc 238. The end disc 238 may include a central aperture 242. The ring 240 may project from one side of the end disc 238 and terminate at a rim 244. The rim 244 may have a slightly larger diameter than the end disc 238.

Also, the first casing member 231 may include at least one first dam member 236. The first dam member(s) 236 may be fixed to the first shell member 234. The first dam member(s) 236 may be layered on and fixed to an outer surface of the first shell member 234. The first dam member(s) 236 may also project in the outboard direction from the outer surface of the first shell member 234. Thus, the first dam member(s) 236 may be referred to as "projecting portions" or "outboard parts" that project from the shell member(s) 234 in the outboard direction.

The first dam members 236 may include a first circumferential dam 246, which is layered on the outer surface of the first shell member 234, and which extends in the circumferential direction thereon. The first circumferential dam 246 may be disposed proximate the rim 244. The first dam members 236 may also include a second circumferential dam 248. The second circumferential dam 248 may be layered on the outer surface of the first shell member 234 and may extend in the circumferential direction thereon. The second circumferential dam 248 may be disposed proximate the transition between the rim 244 and the end disc 238. Furthermore, the first dam members 236 may include an elongate dam 249. The elongate dam 249 may include a plurality of elongate and straight segments, such as a first segment 245 that extends longitudinally along the annular ring 240, and a second segment 247 that extends radially along the end disc 238. As shown in FIGS. 4 and 5, there may be a space 254 defined circumferentially between the elongate dam 249 and a terminal end of the second circumferential dam 248.

In some embodiments, the first shell member 234 and the first dam members 236 may be made from different materials. For example, in some embodiments, the first shell member 234 may be made from a metallic material, whereas the first dam members 236 may be made from a polymeric material. However, it will be appreciated that, in other embodiments, the first shell member 234 and dam members 236 may both be made from a metallic material or, alternatively, both made from a polymeric material. Furthermore, in some embodiments, the first shell member 234 and dam members 236 may be made from the same material and may define a unitary, one-part member.

The second casing member 232 may include a second shell member 264. As shown in FIG. 5, the second shell member 264 may be unitary, cup-shaped, and thin-walled (e.g., as low as one millimeter wall thickness). The second shell member 264 may include a circular and plate-like end disc 268 (FIG. 5) and an annular ring 270 fixed thereto. The annular ring 270 may have a substantially constant diameter. The end disc 268 may include a central aperture 272. The ring 270 may project from one side of the end disc 268 and terminate at a rim 274. The ring 270 may also include an elongate side opening 276 extending therethrough.

Also, the second casing member 232 may include at least one second dam member 266. The second dam member(s) 266 may be fixed to the second shell member 264. The second dam member(s) 266 may be fixed to an outer surface of the second shell member 264. The second dam member(s) 266 may also project in the outboard direction from the outer surface of the second shell member 264. Thus, the second dam member(s) 266 may be referred to as "projecting portions" or "outboard parts" that project from the shell member(s) 264 in the outboard direction.

The second dam members 266 may include an outer skirt 278, which extends about the ring 270. The second dam members 266 may include an end dam 279, which extends radially along the end disc 268.

In some embodiments, the second shell member 264 and the second dam members 266 may be made from different materials. For example, in some embodiments, the second shell member 264 may be made from a metallic material, whereas the second dam members 266 may be made from a polymeric material. However, it will be appreciated that, in other embodiments, the second shell member 264 and dam members 236 may both be made from a metallic material or, alternatively, both made from a polymeric material. Furthermore, in some embodiments, the first shell member 234 and dam members 236 may be made from the same material and may define a unitary, one-part member.

At least one of the first and second casing members 231, 232 may be formed according to embodiments of the present disclosure. For example, both may be formed using a combination of metal forming and overmolding processes. In some embodiments, the first casing member 231 may be formed by metal forming (e.g., cold working via stamping, pressing, or other similar process) the first shell member 234. Then, the first dam members 236 may be overmolded onto the first shell member 234. Furthermore, the second casing member 232 may be formed similarly, by metal forming the second shell member 264 and subsequently overmolding the second dam member 266 onto the second shell member 264. The skirt 278 may be overmolded to include an opening that aligns with the side opening 276. The casing members 231, 232 may also be heat treated, coated, or otherwise treated before further assembly.

The first and second casing members 231, 232 may be joined and, in some embodiments, removably attached (FIGS. 3-5). As shown in FIG. 5, the first casing member 231 may be received in the second casing member 232. The rim 244 of the first casing member 231 may be received within the rim 274 of the second casing member 232. The outer radial surface of the rim 244 may be fluidly sealed to the inner radial surface of the rim 274. Thus, the annular rings 240, 270, the skirt 278, and the first and second circumferential dams 246, 248 may extend about the axis 108 and may define the side 203 of the motor case 228. Also, the end disc 268 and the end dam 279 may extend radially with respect to the axis 108 and may define the first end 201 of the motor case 228. Furthermore, the end disc 238 and the elongate dam 249 may define the second end 202 of the motor case 228. The first and second casing members 231, 232 may be joined and sealed using adhesives, fasteners, an interference fit, or otherwise.

The motor case 228 may further include and define at least one through-hole, such as a first through-hole 296 (FIGS. 2-4 and 6) and a second through-hole 298 (FIGS. 3-7). The through-holes 296, 298 may have any suitable shape and may be referred to as gaps, apertures, or other types of openings that allow the coolant to pass therethrough for flow between one part of the coolant jacket 214 to another. The through-holes 296, 298 may be defined independently to have a continuous fluid boundary extending through the motor case 228. Thus, while some of the coolant jacket 214 may be cooperatively defined by the motor case 228 and the outer housing 204, the through-holes 296, 298 may be define part of the coolant jacket 214 independently from the outer housing 204.

In some embodiments represented in FIG. 3, the skirt 278 may include an attached area 273 that is layered on and attached to the outer surface of the annular ring 270. The skirt 278 also projects outwardly in the radial direction from the attached area 273 and may extend about the ring 270. The skirt 278 may also include a first detached area 275 and a second detached area 271 that are detached from the ring 270. The outer surfaces of the detached area 271, 275 and attached areas 273 of the skirt 278 may be flush as shown in FIGS. 3 and 4 so as to be smooth, continuous, and annular.

The first detached area 275 may extend from one circumferential end of the attached area 273 to the first segment 245 of the elongate dam 249. The first detached area 275 may also be spaced apart in the outboard direction (i.e., the radial direction) from the outer surface of the shell member 264 to define the first through-hole 296 therebetween in the radial direction. As such, the first through-hole 296 may extend longitudinally (e.g., substantially parallel to the axis 108) through the motor case 228, between the shell member 264 and the skirt 278. Also, the first through-hole 296 may be arcuately shaped so as to extend circumferentially with respect to the axis 108.

The second detached area 271 may extend from the opposite circumferential end of the attached area 273 to the first segment 245 of the elongate dam 249. The second detached area 271 may be spaced apart in the outboard direction (i.e., the radial direction) from the outer surface of the shell member 264 to define the second through-hole 298 therebetween in the radial direction. As such, the second through-hole 298 may extend longitudinally (e.g., substantially parallel to the axis 108) through the motor case 228, between the shell member 264 and the skirt 278. Also, the second through-hole 298 may be arcuately shaped so as to extend circumferentially with respect to the axis 108.

As shown in FIGS. 2 and 6-8, the motor case 228 may be received in the outer housing 204. The motor case 228 may be nested therein with: 1) outer surfaces of the first and second dam members 236, 266 (FIGS. 3-5) lying adjacent the opposing inner faces 208, 209, 210 of the outer housing cavity 206; and 2) outer surface of the first and second shell members 234, 264 spaced apart at a distance from the opposing inner faces 208, 209, 210 of the outer housing cavity 206.

Accordingly, as shown in FIGS. 2 and 6-8, the coolant jacket 214 may be at least partly defined by the space between the outer surface of the shell members 234, 264 and the inner faces 208, 209, 210 of the outer housing cavity 206. Fluid from the inlets 212, 213 (FIG. 2) can flow through this space to the outlet 216 (FIG. 7). The first and second dam members 236, 266 may partition the coolant jacket 214 such that coolant is directed to low primarily along a predetermined path through the coolant jacket 214.

Figure 8:
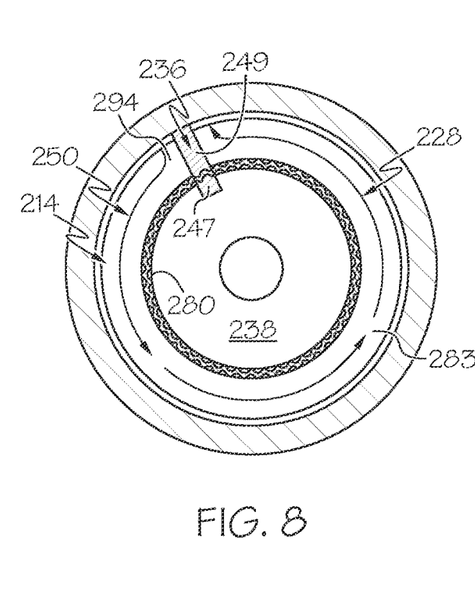
FIG. 8 is a second end view of the cooling system of FIG. 6.

Furthermore, the e-boosting device 100 may include one or more sealing members. The sealing members may be independent parts that are sealed to the motor case 228 and/or to the outer housing 204. The sealing members may, thus, further partition the coolant jacket 214. For example, the assembly 100 may include a first sealing member 280 (FIGS. 2, 7, and 8). The first sealing member 280 may be a polymeric O-ring that is centered on the axis 108, and which may be disposed between and sealed to the end disc 238 and the face 209. As shown in FIG. 7, the face 209 may include a groove that receives the first sealing member 280. The assembly 100 may additionally include a second sealing member 282. The second sealing member 282 may be a polymeric O-ring that is centered on the axis 108, and which may be disposed between and sealed to the outer radial surface of the skirt 278 and the side face 210. As shown in FIGS. 2 and 7, the outer skirt 278 may include a groove 284 that receives the second sealing member 282. Furthermore, the assembly 100 may additionally include a third sealing member 286. The third sealing member 286 may be a polymeric O-ring that is centered on the axis 108, and which may be disposed between and sealed to the end surface of the skirt 278 and the face 208 of the outer housing 204. As shown in FIGS. 2 and 7, the face 208 may include a groove that receives the third sealing member 286. Also, the assembly 100 may additionally include a fourth sealing member 288 (FIGS. 2 and 7). The fourth sealing member 288 may be a polymeric O-ring that is centered on the axis 108, and which may be disposed between and sealed to the end disc 268 and the face 208. As shown in FIG. 7, the face 208 may include a groove that receives the fourth sealing member 288.

Thus, one or more continuous fluid pathways may be defined through the coolant jacket 214 from the inlets 212, 213 to the outlet 216. As illustrated, there may be a plurality of pathways that flow in-parallel through the coolant jacket 214 as will be discussed.

Specifically, a first coolant flow path (i.e., a circumferential flow path) may be defined. Coolant from the inlet 212 (FIG. 2) may be provided to a first inlet area 290 (FIGS. 2 and 4) and then to a side chamber 281 of the coolant jacket 214. The side chamber 281 may surround the side 203 of the motor case 228. The side chamber 281 may be collectively defined by the first circumferential dam 246, the skirt 278, the elongate dam 249, the outer surface of the first shell member 234, and the face 210 of the outer housing 204. Fluid in the side chamber 281 may flow circumferentially about the motor case 228 to an outlet area 292 on the opposite side of the elongate dam 249 (FIGS. 4 and 7). This outlet area 292 may be fluidly connected to the outlet 216 (FIG. 7) for discharging this coolant.

Also, a second coolant flow path (i.e., a first end flow path) may be defined. Coolant from the inlet 213 (FIG. 2) may be provided to a second inlet area 294 and then to a first end chamber 283 of the coolant jacket 214. The first end chamber 283 may surround the end 202 of the motor case 228. The first end chamber 283 may be collectively defined by the second circumferential dam 248, the second segment 247 of the elongate dam 249, the first sealing member 280, the end disc 238, and the face 209. Fluid in the first end chamber 283 may flow circumferentially about the motor case 228 to the space 254 (FIG. 4) and, then, to the outlet area 292 for coolant discharge.

Furthermore, a third coolant flow path (i.e., a second end flow path) may be defined. The first through-hole 296 of the motor case 228 may fluidly connect the side chamber 281 to a second end chamber 285 of the coolant jacket 214. The second end chamber 285 may surround the end 201 of the motor case 228. The second end chamber 285 may be collectively defined by the skirt 278, the sealing member 288, the outer surface of the end disc 268, and the face 208 of the second shell member 264. In this coolant flow path, coolant that is inlet via the first inlet 212 may flow through the first through-hole 296 and into the second end chamber 285. This fluid may flow circumferentially about the end disc 268 toward the second through-hole 298. The second through-hole 298 may fluidly connect and outlet the second end chamber 285 to the outlet area 292 of the side chamber 281 of the coolant jacket 214 to discharge via the outlet 216.

It will be appreciated that the cooling system 250 provides effective cooling. The cooling system 250, the motor case 228, and more generally the e-boosting device 100 is highly compact and lightweight as well. The e-boosting device 100 may be manufactured efficiently as well.

The through-holes 296, 298 through the motor case 228 provide useful routing of the coolant through the coolant jacket 214. The through-holes 296, 298 may be formed easily for routing the coolant. Various through-hole configurations may be included in additional embodiments as well. Through-holes may extend radially in some embodiments, at an angle relative to the axis 108, or along a nonlinear axis. These different variations can be included using efficient manufacturing methods as well, thereby providing a strong, chemically-resistant, nonmagnetic motor case 228.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. A motor assembly for an e-boosting device comprising:
a motor case;
a motor cavity within the motor case configured to receive an electric motor that is configured to drivingly rotate a rotor about an axis of rotation;
a through-hole independently defined by the motor case to pass through the motor case; and
the motor case configured to be received in an outer housing to cooperatively define a coolant jacket with the outer housing, the coolant jacket including a fluid flow path defined partly by the through-hole, the motor case defining a shell portion that covers over the electric motor and a projecting portion that projects from the shell portion in an outboard direction, the through-hole being defined at least partly by the projecting portion, and the shell portion and the projecting portion being made of different materials.

2. The motor assembly of claim 1, wherein the shell portion is made of a metallic material and the projecting portion is made of a polymeric material.

3. The motor assembly of claim 1, wherein the projecting portion is configured to cooperatively define a fluid boundary with the outer housing for a coolant in the coolant jacket.

4. The motor assembly of claim 3, further comprising a sealing member that seals to the projecting portion and the outer housing to define a sealed fluid boundary.

5. The motor assembly of claim 4, wherein the projecting portion includes a groove that receives the sealing member.

6. The motor assembly of claim 1, herein the projecting portion includes an attached area that is attached to an outer surface of the shell portion;
wherein the projecting portion includes a detached area that extends from the attached area and that is spaced apart in the outboard direction from the outer surface to at least partly define the through-hole.

7. The motor assembly of claim 6, wherein the detached area extends in a circumferential direction about the axis.

8. The motor assembly of claim 6, wherein the attached area projects in the radial direction relative to the axis in the outboard direction.

9. The motor assembly of claim 1, wherein the through-hole extends longitudinally through the motor case with respect to the axis.

10. The motor assembly of claim 1, wherein the motor case includes a first casing member and a second casing member that are attached to cooperatively define the motor cavity;
wherein the first casing member includes a first shell portion and a first projecting portion made of different materials;
wherein the second casing member includes a second shell portion and a second projecting portion made of different materials; and
wherein the through-hole is defined between the second shell portion and the second projecting portion.

11. The motor assembly of claim 10, wherein the first shell portion is made of metal and the first projecting portion is made of a polymer;
wherein the second shell portion is made of metal and the second projecting portion is made of a polymer.

12. The motor assembly of claim 10, wherein the first casing member and the second casing member are attached to cooperatively encase the electric motor; and
wherein the first projecting portion and the second projecting portion partition the coolant jacket.

13. The motor assembly of claim 1, wherein the motor case includes an end face that extends radially relative to the axis and a side that extends about the axis;
wherein the coolant jacket includes an end chamber partly defined by the end face and a side chamber partly defined by the side of the motor case; and
wherein the through-hole fluidly connects the end chamber and the side chamber.

14. A method of manufacturing an e-boosting device comprising:
providing an electric motor that is configured to drivingly rotate a rotor;
forming a motor case to include a shell portion and a projecting portion that projects from the shell portion in an outboard direction, including forming the shell portion from a first material and forming the projecting portion from a second material that is different from the first material, and including forming a through-hole that is independently defined by the motor case to pass through the motor case, the through-hole being defined at least partly by the projecting portion;
encasing the electric motor within a motor cavity of the motor case;
disposing the motor cavity within an outer housing to define a coolant jacket of a cooling system, the coolant jacket cooperatively defined by the outer housing and the motor case, the coolant jacket including a fluid passage defined by the through-hole.

15. The method of manufacturing of claim 14, wherein forming the shell portion from a metallic material and forming the projecting portion from a polymeric material.

16. The method of manufacturing of claim 14, further comprising providing a sealing member that seals to the projecting portion and the outer housing to define a fluid boundary for the coolant.

17. The method of claim 16, further comprising forming the projecting portion to include a groove; and
further comprising placing the sealing member in the groove.

18. The method of manufacturing of claim 14,
wherein the motor case includes an end face that extends radially relative to the axis and a side that extends about the axis;
wherein the coolant jacket includes an end chamber partly defined by the end face and a side chamber partly defined by the side of the motor case; and
wherein the through-hole fluidly connects the end chamber and the side chamber.

* * * * *